United States Patent [19]

Hendricks et al.

[11] Patent Number: 5,542,117
[45] Date of Patent: Jul. 30, 1996

[54] METHOD AND APPARATUS FOR BATERY SAVING IN A COMMUNICATION RECEIVER

[75] Inventors: Karen Hendricks, Boca Raton; Sarah J. Fain, Lake Worth; Kenneth S. Lerner, Boca Raton, all of Fla.

[73] Assignee: Motorola, Inc., Schaumburg, Ill.

[21] Appl. No.: 254,082

[22] Filed: Jun. 3, 1994

[51] Int. Cl.$^6$ .................................................. H04B 1/16
[52] U.S. Cl. .................. 455/343; 455/38.1; 340/825.44
[58] Field of Search .................................. 455/38.3, 127, 455/343; 340/825.44, 311; 370/84

[56] References Cited

U.S. PATENT DOCUMENTS

| | | |
|---|---|---|
| 4,663,623 | 5/1987 | Lax et al. . |
| 4,768,032 | 8/1988 | Sharpe et al. . |
| 4,837,854 | 6/1989 | Oyagi et al. . |
| 4,860,003 | 8/1989 | DeLuca et al. . |
| 4,961,073 | 10/1990 | Drapac et al. . |
| 4,995,099 | 2/1991 | Davis ..................................... 455/343 |
| 5,168,493 | 12/1992 | Nelson et al. . |
| 5,384,564 | 1/1995 | Wycoff et al. .......................... 455/343 |

*Primary Examiner*—Reinhard J. Eisenzopf
*Assistant Examiner*—Doris To
*Attorney, Agent, or Firm*—R. Louis Breeden

[57] ABSTRACT

A method and apparatus in a receiver (110) for use in a selective call communication system (100) conserves battery power. The system (100) utilizes a signaling protocol (300) comprising a first bit and frame sync (320) transmitted at a predetermined baud rate, followed by a second bit and frame sync (322) transmitted at a second baud rate. The first bit and frame sync (320) defines the second baud rate. The receiver (110) synchronizes (406, 410) with the first bit and frame sync (320), determines (416) therefrom the second baud rate, and battery saves (420) during transmission of the second bit and frame sync (322) in response to determining that the second baud rate is equal to the predetermined baud rate.

6 Claims, 3 Drawing Sheets

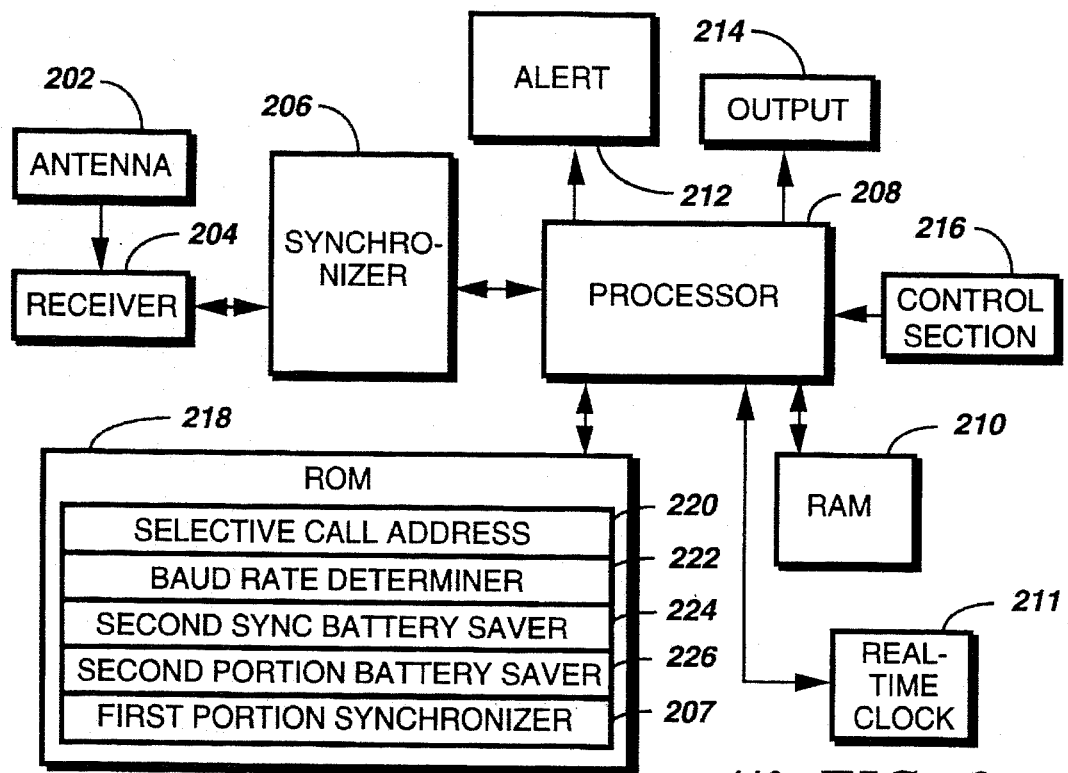
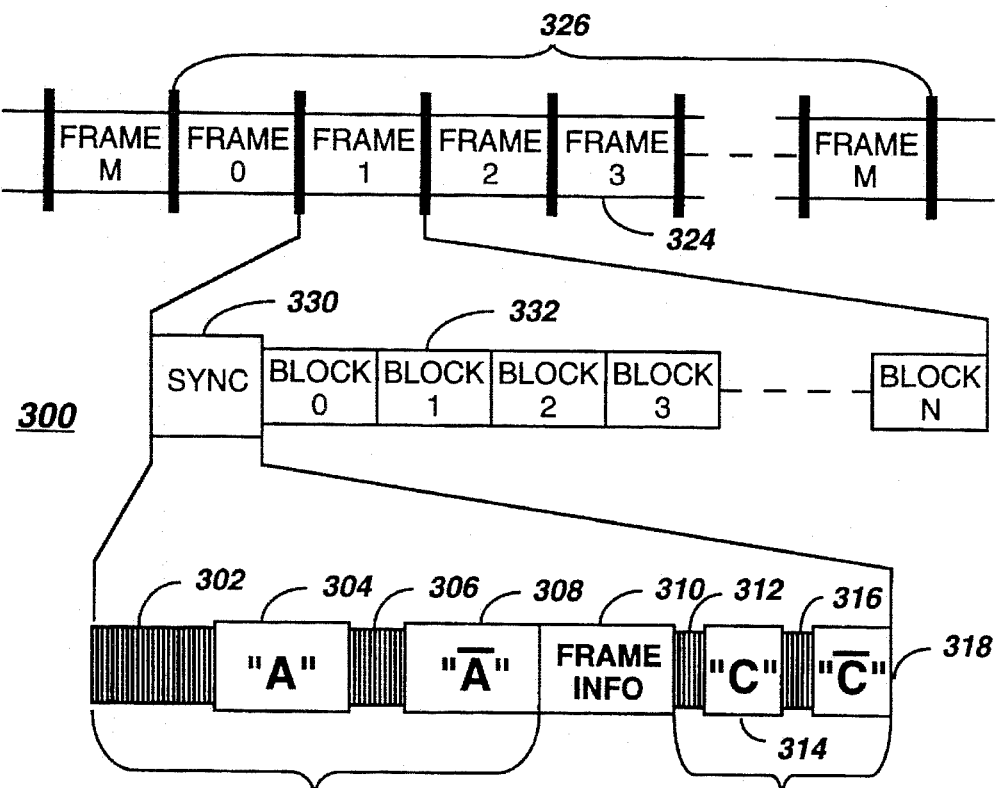
FIG. 3
PRIOR ART

METHOD AND APPARATUS FOR BATERY SAVING IN A COMMUNICATION RECEIVER

FIELD OF THE INVENTION

This invention relates in general to communication receivers, and more specifically to battery saving in a communication receiver.

BACKGROUND OF THE INVENTION

Battery saving techniques for portable communication receivers are well known. Battery life has become so important in radio pagers that entirely new signaling protocols have been developed with battery life extension a primary motivation. One new signaling protocol is a synchronous protocol comprising a sync block having a first bit and frame sync transmitted at a predetermined baud rate, followed by a second bit and frame sync transmitted at a second baud rate. The second baud rate may be either the same as the first baud rate, or a different (higher) baud rate. The first bit and frame sync defines the second baud rate. Both the first and second bit and frame syncs comprise redundant first and second portions to provide greater reception reliability in weak signal environments.

Current pagers operating on the new signaling protocol monitor and synchronize with the entire first bit and frame sync at the predetermined baud rate. The pagers then monitor and synchronize with the entire second bit and frame sync at the second baud rate. Under some conditions, such monitoring of the first and second bit and frame syncs in their entirety is required for proper operation of the pager. Under certain other conditions, however, such complete monitoring of the syncs is not necessary for proper operation of the pager, and is wasteful of battery life.

Thus, what is needed is a method and apparatus that can determine dynamically whether complete monitoring of the sync block is required, and that can perform accordingly in order to save battery power.

SUMMARY OF THE INVENTION

One aspect of the present invention is a battery saving method in a receiver for use in a selective call communication system. The system utilizes a signaling protocol comprising a first bit and frame sync transmitted at a predetermined baud rate. The first bit and frame sync is followed by a second bit and frame sync transmitted at a second baud rate. The first bit and frame sync defines the second baud rate. The battery saving method comprises the steps of synchronizing with the first bit and frame sync, determining therefrom the second baud rate, and battery saving during transmission of the second bit and frame sync in response to determining that the second baud rate is equal to the predetermined baud rate.

A second aspect of the present invention is a battery saving method in a receiver for use in a selective call communication system. The system utilizes a signaling protocol comprising redundant first and second portions of a bit and frame sync. The battery saving method comprises the steps of attempting to synchronize with the first portion of the bit and frame sync, and battery saving during transmission of the second portion of the bit and frame sync in response to synchronizing successfully with the first portion thereof.

A third aspect of the present invention is a communication receiver which provides battery saving for use in a selective call communication system. The system utilizes a signaling protocol comprising a first bit and frame sync transmitted at a predetermined baud rate. The first bit and frame sync is followed by a second bit and frame sync transmitted at a second baud rate. The first bit and frame sync defines the second baud rate. The communication receiver comprises a receiver element for receiving the signaling protocol, and a processor coupled to the receiver element for processing the signaling protocol to derive information therefrom. The communication receiver further comprises a selective call address element coupled to the processor for defining at least one selective call address to which the communication receiver is responsive for receiving the information, and a synchronizer coupled to the receiver element and coupled to the processor for synchronizing the communication receiver with the first and second bit and frame syncs of the signaling protocol. The communication receiver further comprises a baud rate determiner coupled to the processor for determining the second baud rate from the first bit and frame sync, and a second sync battery saver element coupled to the processor for battery saving during transmission of the second bit and frame sync in response to the second baud rate being equal to the predetermined baud rate.

A fourth aspect of the present invention is a communication receiver which provides battery saving for use in a selective call communication system. The system utilizes a signaling protocol comprising redundant first and second portions of a bit and frame sync. The communication receiver comprises a receiver element for receiving the signaling protocol, and a processor coupled to the receiver element for processing the signaling protocol to derive information therefrom. The communication receiver further comprises a selective call address element coupled to the processor for defining at least one selective call address to which the communication receiver is responsive for receiving the information, and a synchronizer coupled to the receiver element and coupled to the processor for attempting to synchronize with the first portion of the bit and frame sync of the signaling protocol. The communication receiver further comprises a second portion battery saver element coupled to the processor for battery saving during transmission of the second portion of the bit and frame sync in response to synchronizing successfully with the first portion thereof.

BRIEF DESCRIPTION OF THE DRAWINGS

FIG. 2 is an electrical block diagram of a communication receiver in accordance with the preferred embodiment of the present invention.

FIG. 3 is a representation of a well-known signaling protocol utilized by the selective call communication system in accordance with the preferred embodiment of the present invention.

DESCRIPTION OF THE PREFERRED EMBODIMENT

Figure 1:
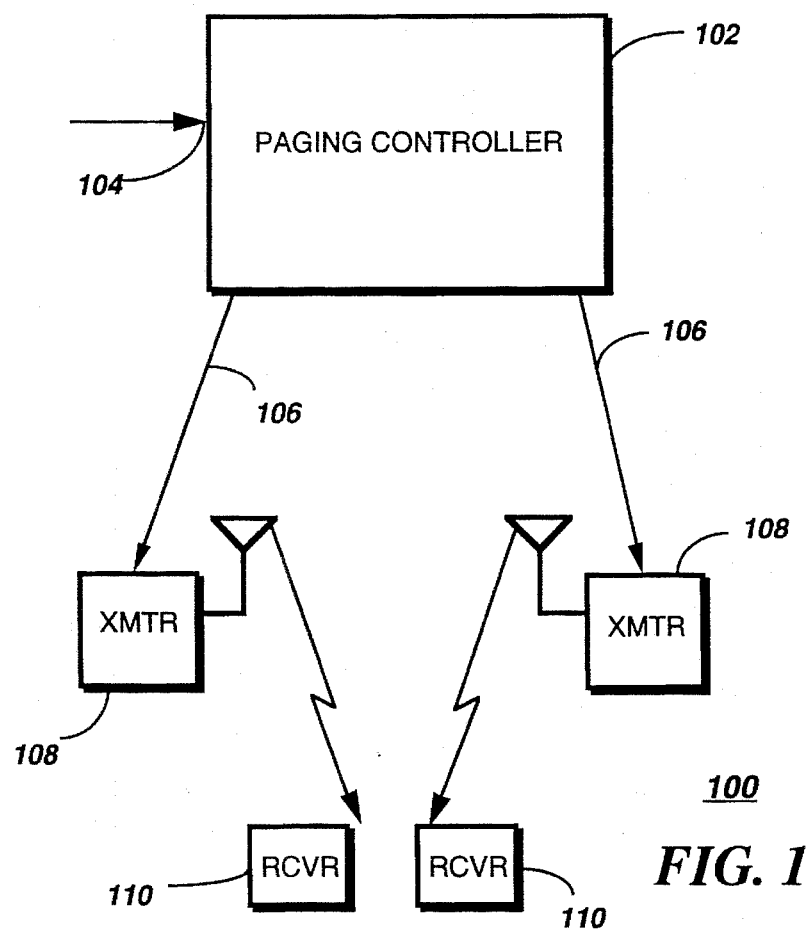
FIG. 1 is an electrical block diagram of a selective call communication system in accordance with the preferred embodiment of the present invention.

Referring to FIG. 1, a system block diagram of a selective call communication system 100 in accordance with the preferred embodiment of the present invention comprises a paging controller 102 for formatting selective call messages and controlling the transmission thereof. The paging controller 102 comprises a telephone input 104 for receiving calls directed to individual selective call receiver addresses in a manner well known in the art. The paging controller 102 is coupled by at least one line 106 to at least one paging transmitter 108 for transmitting the selective call messages by radio communications to at least one selective call communication receiver 110. Preferably, the paging controller 102 is similar to a model E09PED0552 PageBridge® paging terminal, the paging transmitter 108 is similar to a model C73 PURC 5000® transmitter, and the communication receiver 110 is similar to a model A03KLB5962CA ADVISOR® pager, all manufactured by Motorola, Inc. of Schaumburg, Ill. It will be appreciated that other similar equipment may be used as well to construct the communication system 100.

During operation, the paging controller 102 receives and queues calls directed to selected ones of the at least one communication receiver 110. Periodically, the paging controller 102 controls the at least one paging transmitter 108 to transmit the queued calls utilizing a well-known signaling protocol 300 (FIG. 3) for selective call message transmission. The general system operation and the signaling protocol 300 are preferably similar to those which are disclosed in U.S. Pat. No. 5,168,493, issued Dec. 1, 1992, to Nelson et al., which patent is hereby incorporated herein by reference.

Referring to FIG. 2, an electrical block diagram of the communication receiver 110 in accordance with the preferred embodiment of the present invention comprises an antenna 202 for intercepting an RF signal including information transmitted in the signaling protocol 300. The antenna 202 is coupled to a conventional receiver element 204 for receiving and demodulating the RF signal intercepted. A synchronizer 206 is coupled to the receiver element 204 for synchronizing the communication receiver 110 to the signaling protocol 300. Preferably, the synchronizer 206 is similar to the synchronizer/phase selector disclosed in U.S. Pat. No. 5,168,493 to Nelson et al.

A processor 208, e.g., the MC68HC05, C08, or C11 series microcomputer manufactured by Motorola, Inc. of Schaumburg, Ill., is coupled to the synchronizer 206 for processing the information received. The processor 208 is coupled to a conventional random access memory (RAM) 210 for storing the received information. The processor 208 is also coupled to a conventional real-time clock 211 for timing events affecting the communication receiver 110. A conventional alert generator 212 is coupled to the processor 208 for providing an audible or tactile alert to a user when the processor 208 has a message ready for presentation.

An output device 214 comprises a conventional visual display or an audio transducer or both, the output device 214 also being controlled by the processor 208. A control section 216 comprises user accessible controls for allowing the user to command the processor 208 to perform the communication receiver operations well known to one of ordinary skill in the art, and typically includes control switches such as an on/off control button, a function control, etc.

The processor 208 is coupled to a conventional read-only memory (ROM) 218 comprising a conventional selective call address element 220 for defining one or more selective call addresses to which the communication receiver 110 is responsive, and a conventional baud rate determiner 222 for determining a second baud rate from the first bit and frame sync of the signaling protocol 300 by analyzing the value of the first frame sync 304 (FIG. 3). The ROM 218 further comprises special processor elements, i.e., firmware elements, in accordance with the preferred embodiment of the present invention. The firmware elements comprise a first portion synchronizer element 207, a second sync battery saver element 224, and a second portion battery saver element 226. The first portion synchronizer element 207 is for attempting synchronization with a first portion of first and second bit and frame syncs transmitted in the signaling protocol 300. The second sync battery saver element 224 is for battery saving during transmission of the second bit and frame sync in response to the second baud rate being equal to a predetermined baud rate at which the first bit and frame sync is transmitted. The second portion battery saver element 226 is for battery saving during transmission of the second portion of the first and second bit and frame syncs in response to synchronizing successfully with the first portion thereof. It will be appreciated that the functions of the synchronizer 206, the RAM 210, the real-time clock 211, and the ROM 218 may be incorporated into the processor 208 as well, as contiguous components thereof. It will be further appreciated that other types of non-volatile memory, e.g., programmable read-only memory (PROM) and electrically-erasable programmable read-only memory (EEPROM), may be used as well for the ROM 218. It will also be appreciated that the functions of the first portion synchronizer element 207, the second sync battery saver element 224, and the second portion battery saver element 226 can be performed by hardware instead of firmware, as well.

Referring to FIG. 3, a representation of the signaling protocol 300 is depicted. The signaling protocol 300 is utilized by the selective call communication system in accordance with the preferred embodiment of the present invention. The signaling protocol 300 comprises a cycle 326 of M frames 324, each frame comprising a sync block 330 followed by N information blocks 332, wherein "M" and "N" represent positive integer values, and wherein "M" is preferably an integer power of two, minus one, e.g., sixty-three or one-hundred-twenty-seven. The information blocks 332 comprise selective call addresses and message information associated with the selective call addresses. The sync block 330 comprises a first bit and frame sync 320 transmitted at a predetermined baud rate, a frame information word 310, and a second bit and frame sync 322 transmitted at a second baud rate, which can be either the same as, or different from, the predetermined baud rate. The information blocks 332 are also transmitted at the second baud rate.

The first bit and frame sync 320 comprises a first portion 302, 304, including a first bit sync 302 and a first frame sync 304. The first frame sync 304 comprises a code word "A", which provides frame synchronization and defines the second baud rate by utilizing a plurality of predetermined values uniquely assigned to a predetermined plurality of the second baud rates. The first bit and frame sync 320 further comprises a redundant second portion 306, 308, including a second bit sync 306 and a second frame sync 308. The second frame sync 308 comprises a code word "inverted A", which also provides frame synchronization and defines the second baud rate in a manner similar to the first frame sync 304. The redundancy of the first and second portions of the first bit and frame sync 320 allows the communication receiver 110 to synchronize with the signaling protocol 300 upon the successful decoding of either the first portion 302, 304, or the second portion 306, 308, or both.

The second bit and frame sync 322 comprises a first portion 312, 314, including a first bit sync 312 and a first frame sync 314. The first frame sync 314 comprises a code word "C", which provides synchronization for the information blocks 332. The second bit and frame sync 322 further comprises a redundant second portion 316, 318, including a second bit sync 316 and a second frame sync 318. The second frame sync 318 comprises a code word "inverted C", which also provides synchronization for the information blocks 332. The redundancy of the first and second portions of the second bit and frame sync 322 allows the communication receiver 110 to synchronize with the signaling protocol 300 upon the successful decoding of either the first portion 312, 314, or the second portion 316, 318, or both.

Preferably, in accordance with the signaling protocol 300, the communication receiver 110 is programmed to synchronously monitor a selected subset of the frames 324, e.g., frames #1, #32, #64, #96, #1, #32, etc., and to save battery power between the monitored frames by switching to a low-power mode. Accordingly, the communication receiver 110 must switch to a full power mode immediately before transmission of each frame to be monitored, in order to resynchronize with the sync block 330.

Figure 4:
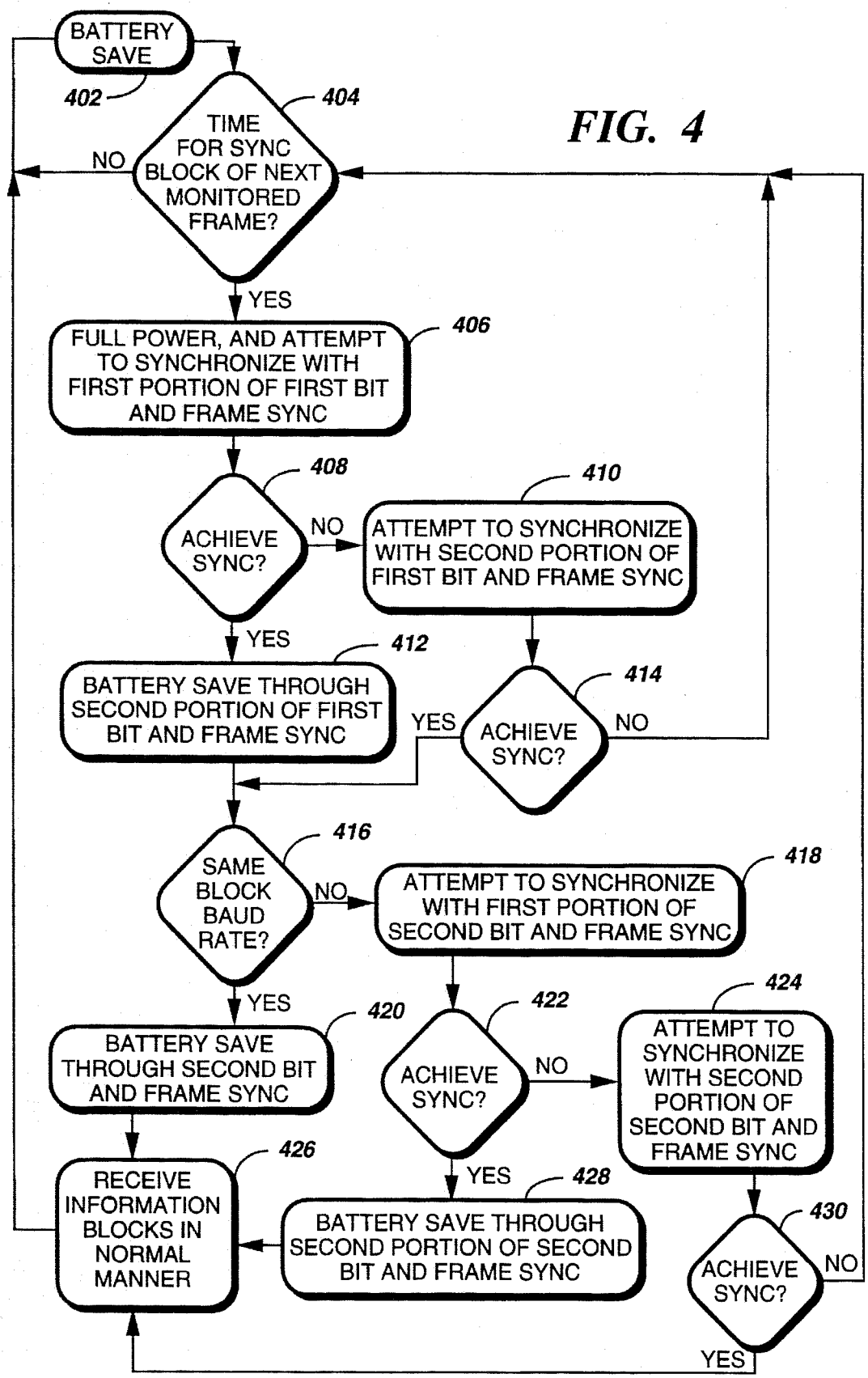
FIG. 4 is a flow chart of battery saver operation in the communication receiver after synchronization with the signaling protocol in accordance with the preferred embodiment of the present invention.

FIG. 4 is a flow chart of battery saver operation in the communication receiver 110 after synchronization with the signaling protocol 300 in accordance with the preferred embodiment of the present invention. When the communication receiver 110 is synchronized with the signaling protocol 300, the processor 208 of the communication receiver 110 "battery saves" 402, i.e., keeps the communication receiver 110 in the low-power mode, until the real-time clock 211 indicates it is time for the transmission of the sync block 330 of the next frame 324 that the communication receiver 110 is programmed to monitor.

When the processor 208 determines in step 404 that the time has come for the transmission of the sync block 330 of the next monitored frame 324, the processor 208 switches the communication receiver 110 to the full power mode, accesses the first portion synchronizer element 207, and controls the synchronizer 206 to attempt 406 to synchronize with the first portion 302, 304 of the first bit and frame sync 320, which is transmitted at the predetermined baud rate. If in step 408 it is determined that synchronization was achieved successfully, then the processor 208 accesses the second portion battery saver element 224 to advantageously control the communication receiver 110 to battery save 412 through the redundant second portion 306, 308 of the first bit and frame sync 320, in accordance with the preferred embodiment of the present invention. Flow then moves to step 416, which is described herein below.

If, on the other hand, in step 408 it is determined that synchronization was not achieved successfully with the first portion 302, 304 of the first bit and frame sync 320, then the processor 208 controls the synchronizer 206 to attempt 410 to synchronize with the second portion 306, 308 of the first bit and frame sync 320. If in step 414 it is determined that synchronization was achieved successfully, then the processor 208 moves to step 416, which is described below. If synchronization was not achieved, then the flow returns to step 404 to battery save until the next monitored frame.

In step 416 the processor 208 accesses the baud rate determiner 222 to evaluate the first or second frame sync 304, 308 that was decoded to determine from the value thereof whether the baud rate of the forthcoming information blocks 332 (and thus the baud rate of the second bit and frame sync 322 utilized to synchronize the information blocks 332) is the same as the predetermined baud rate utilized for the first bit and frame sync 320. If so, the processor 208 controls the communication receiver 110 to monitor the frame information 310, and then accesses the second sync battery saver element 224 to advantageously battery save 420 through the entire second bit and frame sync 322, in accordance with the preferred embodiment of the present invention. Flow then moves to step 426, which is described herein below.

If, on the other hand, in step 416 the first or second frame sync 304, 308 that was decoded is found to indicate that the baud rate of the forthcoming information blocks 332 (and thus the baud rate of the second bit and frame sync 322 utilized to synchronize the information blocks 332) is different from the predetermined baud rate utilized for the first bit and frame sync 320, then the processor 208 again accesses the first portion synchronizer element 207, and controls the synchronizer 206 to attempt 406 to synchronize with the first portion 312, 314 of the second bit and frame sync 322. If in step 422 it is determined that synchronization was achieved successfully, then the processor 208 again accesses the second portion battery saver element 226 to advantageously control the communication receiver 110 to battery save 428 through the redundant second portion 316, 318 of the second bit and frame sync 322, in accordance with the preferred embodiment of the present invention. Flow then moves to step 426, which is described herein below.

If, on the other hand, in step 422 it is determined that synchronization was not achieved successfully with the first portion 312, 314 of the second bit and frame sync 322, then the processor 208 controls the synchronizer 206 to attempt 424 to synchronize with the second portion 316, 318 of the second bit and frame sync 322. If in step 430 it is determined that synchronization was achieved successfully, then the processor 208 moves to step 426, which is described below. If synchronization was not achieved, then the flow returns to step 404 to battery save until the next monitored frame 324.

In step 426 the processor 208 controls the communication receiver 110 to receive and decode the information blocks 332 in a conventional manner in accordance with the signaling protocol 300. Then flow returns to step 402 to battery save until it is time for the next monitored frame 324.

Figure 5:
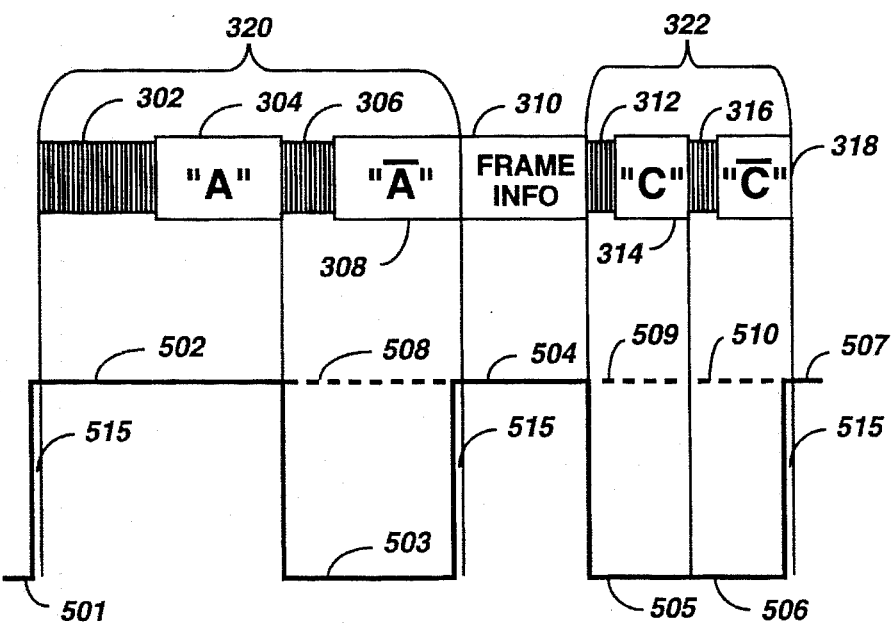
FIG. 5 is a timing diagram depicting battery saver timing with respect to a sync block of the signaling protocol in accordance with the preferred embodiment of the present invention.

FIG. 5 is a timing diagram 500 depicting battery saver timing with respect to the sync block 330 of the signaling protocol 300 in accordance with the preferred embodiment of the present invention. The timing diagram 500 indicates the possible modes of the battery saver during the transmission of the sync block 330. Line segments 501 to 510 indicate battery saver mode under various conditions explained herein below. The line segments 502, 504, 507, 508, 509, and 510 represent battery saver operation that is controlling the communication receiver 110 to operate in the full power mode. The line segments 501, 503, 505, and 506 represent battery saver operation that is controlling the communication receiver 110 to operate in the low power mode.

The solid line segments 501 to 507 represent the optimum battery saving improvement in accordance with the preferred embodiment of the present invention. The solid line segments 501 to 507 represent operation of the preferred embodiment in response to successfully synchronizing with the first portion 302, 304 of the first bit and frame sync 320, and determining therefrom that the information blocks 332 and the second bit and frame sync 322 will be transmitted at the predetermined baud rate. Under these conditions, the processor 208 controls the communication receiver 110 to operate in the high power mode during the transmission of the first portion 302, 304 of the first bit and frame sync 320, and during the frame information word 310, and to operate in the low power mode during all other portions of the sync block 330.

The dashed line segments 508, 509, and 510 represent departures from the optimum battery saving improvement. The departures are necessitated by operating conditions that can occur in the communication system 100. The dashed line segment 508 depicts continued full power operation during the second portion 306, 308 of the first bit and frame sync 320 in response to an unsuccessful synchronization attempt with the first portion 302, 304 of the first bit and frame sync 320. The unsuccessful attempt could be caused, for example, by noise or by a weak received signal. The dashed line segment 509 depicts full power operation during the first portion 312, 314 of the second bit and frame sync 322 in response to the baud rate utilized for the information blocks 332 and for the second bit and frame sync 322 being different from the predetermined baud rate utilized for the first bit and frame sync 320. The dashed line segment 510 depicts full power operation during the second portion 316, 318 of the second bit and frame sync 322 in response to synchronization with the second bit and frame sync 322 being required due to a different baud rate utilized therein, and further in response to an unsuccessful synchronization attempt with the first portion 312, 314 of the second bit and frame sync 322.

It will be appreciated by one of ordinary skill in the art that the processor 208 typically must control the communication receiver 110 to switch from the low power mode to the full power mode a short time, e.g., ten milliseconds, earlier than the start of transmission of a portion of the sync block 330 to be monitored. This earlier low-to-full-power switching time is necessary to allow the communication receiver 110 to "warm up", or stabilize, before the transmissions of the corresponding portions of the sync block 330 begin. The warm-up time is represented in the timing diagram 500 by three warm-up gaps 515. An unavoidable consequence of the warm-up gaps 515 is a reduction of savings of battery power, compared to that which could be saved in a "perfect" receiver requiring no warm up.

One of ordinary skill in the art will further appreciate that the amount of battery power saved by the preferred embodiment of the present invention depends upon several system variables in addition to receiver warm-up time. These system variables include the baud rate utilized by the communication system 100 for transmitting the information blocks 332, and the number of frames 324 monitored per cycle 326 by the communication receiver 110. Evaluations of typical receivers and typical system variables, however, have indicated that the present invention can provide a substantial improvement in battery life—particularly for low-latency receivers, i.e., receivers programmed to monitor a relatively large number of frames per cycle.

Thus, it should have become apparent by now that the present invention provides a method and apparatus that can determine dynamically whether complete monitoring of the sync block is required. Advantageously, an improved battery saver is provided that can selectively interrupt the sync block monitoring to save battery power when it is determined that the sync block monitoring can be selectively reduced without adversely affecting the operation of the communication receiver.

What is claimed is:

1. A battery saving method in a receiver for use in a selective call communication system utilizing a signaling protocol comprising a first bit and frame sync transmitted at a predetermined baud rate, followed by a second bit and frame sync transmitted at a second baud rate, wherein the first bit and frame sync defines the second baud rate, the battery saving method comprising the steps of:

synchronizing with the first bit and frame sync;

determining therefrom the second baud rate; and battery saving during transmission of the second bit and frame sync in response to determining that the second baud rate is equal to the predetermined baud rate.

2. The method of claim 1, wherein the first bit and frame sync comprises redundant first and second portions, and wherein the method further comprises the steps of:

attempting to synchronize with the first portion of the first bit and frame sync; and battery saving during transmission of the second portion of the first bit and frame sync in response to synchronizing successfully with the first portion thereof.

3. The method of claim 1, wherein the second bit and frame sync comprises redundant first and second portions, and wherein the method further comprises the steps of:

attempting to synchronize with the first portion of the second bit and frame sync in response to determining that the second baud rate is different from the predetermined baud rate; and battery saving during transmission of the second portion of the second bit and frame sync in response to synchronizing successfully with the first portion thereof.

4. A communication receiver which provides battery saving for use in a selective call communication system utilizing a signaling protocol comprising a first bit and frame sync transmitted at a predetermined baud rate, followed by a second bit and frame sync transmitted at a second baud rate, wherein the first bit and frame sync defines the second baud rate, the communication receiver comprising:

a receiver element for receiving the signaling protocol;

a processor coupled to the receiver element for processing the signaling protocol to derive information therefrom;

a selective call address element coupled to the processor for defining at least one selective call address to which the communication receiver is responsive for receiving the information;

a synchronizer coupled to the receiver element and coupled to the processor for synchronizing the communication receiver with the first and second bit and frame syncs of the signaling protocol;

a baud rate determiner coupled to the processor for determining the second baud rate from the first bit and frame sync; and a second sync battery saver element coupled to the processor for battery saving during transmission of the second bit and frame sync in response to the second baud rate being equal to the predetermined baud rate.

5. The communication receiver of claim 4, wherein the first bit and frame sync comprises redundant first and second portions, and wherein the communication receiver comprises:

a first portion synchronization element for attempting to synchronize with the first portion of the first bit and frame sync; and a second portion battery saver element coupled to the first portion synchronization element for battery saving during transmission of the second portion of the first bit and frame sync in response to synchronizing successfully with the first portion thereof.

6. The communication receiver of claim 4, wherein the second bit and frame sync comprises redundant first and second portions, and wherein the communication receiver comprises:

a first portion synchronization element for attempting to synchronize with the first portion of the second bit and frame sync in response to determining that the second baud rate is different from the predetermined baud rate; and a second portion battery saver element coupled to the synchronizer for battery saving during transmission of the second portion of the second bit and frame sync in response to synchronizing successfully with the first portion thereof.

* * * * *

UNITED STATES PATENT AND TRADEMARK OFFICE
CERTIFICATE OF CORRECTION

PATENT NO. : 5,542,117
DATED : July 30, 1996
INVENTOR(S) : Hendricks, et. al.

It is certified that error appears in the above-indentified patent and that said Letters Patent is hereby corrected as shown below:

Title page, item [54] and col. 1, line 1, change "BATERY" to --BATTERY--.

Signed and Sealed this

Nineteenth Day of November, 1996

Attest:

BRUCE LEHMAN

Attesting Officer

Commissioner of Patents and Trademarks